(12) United States Patent
Farrell (10) Patent No.: US 11,853,174 B1
(45) Date of Patent: Dec. 26, 2023

(54) MULTIPLE DRIVE FAILURE DATA RECOVERY

(71) Applicant: Dell Products L.P., Round Rock, TX (US)

(72) Inventor: Eamonn Farrell, Douglas (IE)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/862,694

(22) Filed: Jul. 12, 2022

(51) Int. Cl.
*G06F 11/20* (2006.01)
*G06F 11/16* (2006.01)
*G06F 13/10* (2006.01)

(52) U.S. Cl.
CPC ...... *G06F 11/1666* (2013.01); *G06F 11/2094* (2013.01); *G06F 13/102* (2013.01); *G06F 2201/85* (2013.01)

(58) Field of Classification Search
CPC . G06F 11/1666; G06F 11/2094; G06F 13/102
USPC ........................................ 714/6.21, 6.3, 6.32
See application file for complete search history.

(56) References Cited

U.S. PATENT DOCUMENTS

| | | | | |
|---|---|---|---|---|
| 5,708,771 A | * | 1/1998 | Brant | G06F 11/2092 714/22 |
| 11,016,824 B1 | * | 5/2021 | Wells | G06F 11/3075 |
| 2002/0152362 A1 | * | 10/2002 | Cochran | G06F 11/2064 711/114 |
| 2006/0026347 A1 | * | 2/2006 | Hung | G06F 11/1076 711/114 |
| 2006/0277328 A1 | * | 12/2006 | Cherian | G06F 3/0607 710/36 |
| 2014/0365726 A1 | * | 12/2014 | Bennett | G06F 3/0614 711/114 |
| 2019/0332325 A1 | * | 10/2019 | Dong | G06F 12/0804 |
| 2021/0004160 A1 | * | 1/2021 | Shasha | G06F 3/067 |
| 2021/0019083 A1 | * | 1/2021 | Guo | G06F 11/1076 |

FOREIGN PATENT DOCUMENTS

JP   2020502606 A  *  8/2017

* cited by examiner

*Primary Examiner* — Chae M Ko
(74) *Attorney, Agent, or Firm* — Krishnendu Gupta; Nikhil Patel (57) ABSTRACT

One or more aspects of the present disclosure relate to mitigating data loss resulting from storage device failures. In embodiments, an input/output (IO) workload can be received by a storage array. Further, the IO workload's corresponding IO requests stored in the storage array's cache can be relocated in response to a storage device failure.

18 Claims, 6 Drawing Sheets

MULTIPLE DRIVE FAILURE DATA RECOVERY

BACKGROUND

A storage array is a data storage system for block-based storage, file-based storage, or object storage. Rather than store data on a server, storage arrays can include multiple storage devices (e.g., drives) to store vast amounts of data. In addition, storage arrays can include a central management system that manages the data and delivers one or more distributed storage services for an organization. For example, a financial institution can use storage arrays to collect and store financial transactions from local banks (e.g., bank account deposits/withdrawals). Occasionally, a storage array can experience certain events (e.g., power loss, hardware failure, etc.), resulting in data loss.

SUMMARY

In one aspect, a method includes receiving an input/output (IO) workload by a storage array. Additionally, the method includes relocating the IO workload's corresponding IO requests stored in the storage array's cache in response to a storage device failure.

In embodiments, the method can also include detecting two or more storage device failures while the storage array can receive the IO workload.

In embodiments, the method can also include determining whether a drain event has activated in response to the storage device failures.

In embodiments, the method can also include identifying each storage drive related to a drain of the RAID group's healthy drives. Each identified storage drive can replace the current storage drives assigned to the RAID group.

In embodiments, the method can also include reallocating the cached write pending requests to at least one of the storage drive replacements.

In embodiments, the method can also include identifying the two or more storage device failures belonging to a specific redundant array of independent disks (RAID) group of a plurality of RAID groups.

In embodiments, the method can also include identifying at least one of the IO requests targeting the two or more failed storage devices.

In embodiments, the method can also include determining whether at least one IO request is a write pending request cached in one or more memory cache slots. Further, the method can include anticipating receiving additional IO requests from the IO workload targeting the two or more failed storage devices.

In embodiments, the method can also include identifying one or more cache slots corresponding to the write pending request being partially filled.

In embodiments, the method can also include writing data to each empty data block of the partially filled cache slots.

In one aspect, a system is configured to receive an input/output (IO) workload by a storage array. Additionally, the system is configured to relocate the IO workload's corresponding IO requests stored in the storage array's cache in response to a storage device failure.

The system can also be configured to detect two or more storage device failures while the storage array receives the IO workload.

The system can also be configured to determine whether a drain event has activated in response to a storage device failure.

The system can also be configured to identify each storage drive related to a drain of the RAID group's healthy drives. Each identified storage drive can replace the current storage drives assigned to the RAID group.

The system can also be configured to reallocate the cached write pending requests to at least one of the storage drive replacements. Other technical features can be readily apparent to one skilled in the art from the following figures, descriptions, and claims.

The system can also be configured to identify the two or more storage device failures belonging to a specific redundant array of independent disks (RAID) group of a plurality of RAID groups.

The system can also be configured to identify at least one of the IO requests targeting the two or more failed storage devices.

The system can also be configured to determine whether each IO request is a write pending request cached in one or more memory cache slots. Further, the system can anticipate receiving additional IO requests from the IO workload targeting the two or more failed storage devices.

The system can also be configured to identify one or more cache slots corresponding to the write pending request being partially filled.

The system can also be configured to write data to each empty data block of the partially filled cache slots.

Other technical features can be readily apparent to one skilled in the art from the following figures, descriptions, and claims.

DETAILED DESCRIPTION

Organizations often use storage arrays to store data. For example, a financial institution can use storage arrays to store banking account information, deposits, withdrawals, loan information, and other related data. Specifically, a storage array can include multiple storage devices that can store vast amounts of data. Additionally, a storage array can include a management system that manages its memory, storage devices, processing resources (e.g., processors), data, and the like to deliver hosts (e.g., client machines) remote/distributed storage. For example, the management system can logically group one or more storage drives or portion(s) thereof to establish a virtual storage device. Specifically, the management system can form a RAID (redundant array of independent disks) group using a set of the array's storage devices.

The management system can logically segment the RAID group's corresponding storage devices to establish the virtual storage device. For instance, the management system can logically segment the storage devices to enable data striping. Specifically, data striping includes segmenting logically sequential data, such as a file, so consecutive segments are physically stored on different RAID group storage devices. Additionally, the management system can store parity information corresponding to each segment on a single storage device (parity drive) or across the different RAID group storage devices. Thus, a RAID group can include data (D) member devices (D) and parity member devices (P). The D member devices can store data corresponding to input/output (IO) write requests from one or more hosts. The P member devices can store the parity information such as "exclusive-ORs" (XORs) of the data stored on the D member devices. Thus, the management system can use the parity information to recover data if a D member device fails.

Further, a storage array can issue storage confirmation responses to a host (e.g., a computing device) from which it receives an IO data write request. Accordingly, the storage array's performance can be a function of the time the host takes to receive the confirmation response. Because writing data to a storage device can be slow, the storage array's response time can be greater than the host-requirement performance. Thus, RAID techniques can include policies that improve a storage array's performance (e.g., response times). Specifically, the policies can instruct a storage array to return storage confirmation responses after caching IO write data (e.g., on volatile memory) but before writing it to one or more physical storage devices. However, such techniques can cause the storage array to issue false confirmation responses. For example, a host can issue an IO write request contemporaneous to a drive failure. In response to receiving the IO request, the storage array can determine that the IO request's target storage drive corresponds to the failed drive after it has already cached the IO and sent a confirmation response. Consequently, the storage array may be unable to destage the cached data to a storage drive, causing it to lose the data. Embodiments of the present disclosure relate to mitigating such data loss as described in greater detail herein.

Figure 1:
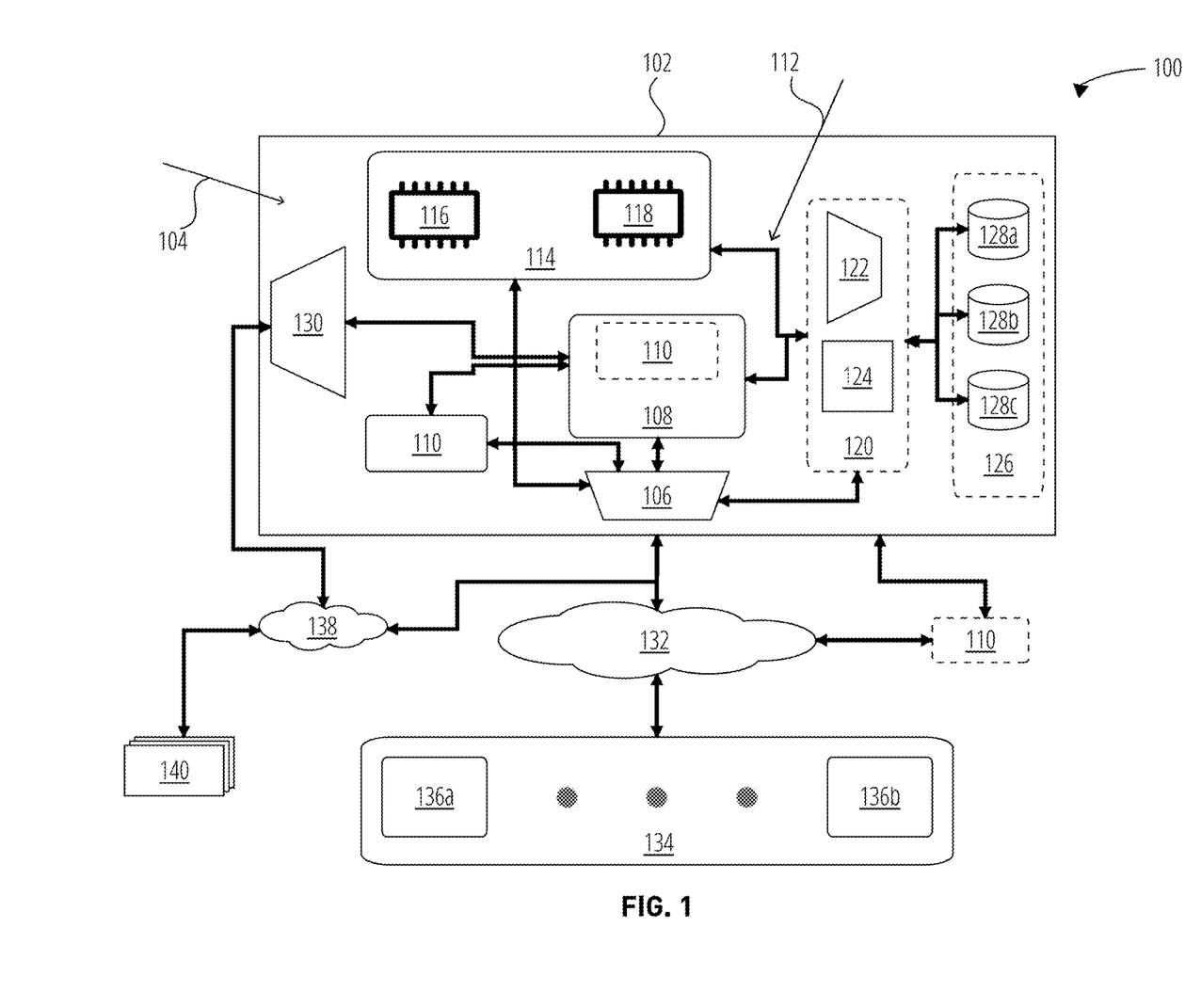
FIG. 1 illustrates a distributed network environment that includes a storage array in accordance with embodiments of the present disclosure.

Regarding FIG. 1, a distributed network environment 100 can include a storage array 102, a remote system 140, and hosts 134. In embodiments, the storage array 102 can include components 104 that perform one or more distributed file storage services. In addition, the storage array 102 can include one or more internal communication channels 112 like Fibre channels, busses, and communication modules that communicatively couple the components 104.

In embodiments, the storage array 102, components 104, and remote system 140 can include a variety of proprietary or commercially available single or multi-processor systems (e.g., parallel processor systems). The single or multi-processor systems can include central processing units (CPUs), graphical processing units (GPUs), and the like. Additionally, the storage array 102, remote system 140, and hosts 134 can virtualize one or more of their respective physical computing resources (e.g., processors (not shown), memory 114, and storage devices 126).

In embodiments, the storage array 102 and, e.g., one or more hosts 134 (e.g., networked devices) can establish a network 132. Similarly, the storage array 102 and a remote system 140 can establish a remote network (RN 138). Further, the network 132 or the RN 138 can have a network architecture that enables networked devices to send/receive electronic communications using a communications protocol. For example, the network architecture can define a storage area network (SAN), local area network (LAN), wide area network (WAN) (e.g., the Internet), and Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

Further, the storage array 102 can connect to the network 132 or RN 138 using one or more network interfaces. The network interface can include a wired/wireless connection interface, bus, data link, and the like. For example, a host adapter (HA) 106, e.g., a Fibre Channel Adapter (FA) and the like, can connect the storage array 102 to the network 132 (e.g., SAN). Likewise, a remote adapter (RA) 130 can also connect the storage array 102 to the RN 138. Further, the network 132 and RN 138 can include communication mediums and nodes that link the networked devices. For example, communication mediums can include cables, telephone lines, radio waves, satellites, infrared light beams, etc. Additionally, the communication nodes can include switching equipment, phone lines, repeaters, multiplexers, and satellites. Further, the network 132 or RN 138 can include a network bridge that enables cross-network communications between, e.g., the network 132 and RN 138.

In embodiments, hosts 134 connected to the network 132 can include client machines 136a-136b, running one or more applications. The applications can require one or more of the storage array's services. Accordingly, each application can send one or more input/output (IO) messages (e.g., a read/write request or other storage service-related request) to the storage array 102 over the network 132. Further, the IO messages can include metadata defining performance requirements according to a service level agreement (SLA) between hosts 134 and the storage array provider.

In embodiments, the storage array 102 can include a memory 114 such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 116) that can cache IO messages and their respective data payloads. Additionally, the memory 114 can include local memory (LM 118) that stores instructions that the storage array's processor(s) can execute to perform one or more storage-related services. In addition, the storage array 102 can deliver its distributed storage services using storage devices 126. For example, the storage devices 126 can include multiple thin-data devices (TDATs) such as persistent storage devices 128a-128c. Further, each TDAT can have distinct performance capabilities (e.g., read/write speeds) like hard disk drives (HDDs) and solid-state drives (SSDs).

In embodiments, the storage array 102 can include an Enginuity Data Services processor (EDS) 108 that performs one or more memory and storage self-optimizing operations (e.g., one or more machine learning techniques). Specifically, the operations can implement techniques that deliver performance, resource availability, data integrity services, and the like based on the SLA and the performance characteristics (e.g., read/write times) of the array's memory 114 and storage devices 126. For example, the EDS 108 can deliver hosts 134 (e.g., client machines 136a-136b) remote/distributed storage services by virtualizing the storage array's memory/storage resources (memory 114 and storage devices 126, respectively).

In embodiments, the storage array 102 can also include a controller 110 (e.g., management system controller) that can reside externally from or within the storage array 102 and one or more of its component 104. When external from the storage array 102, the controller 110 can communicate with the storage array 102 using any known communication connections. The communications connections can include a serial port, parallel port, network interface card (e.g., Ethernet), etc. Further, the controller 110 can include logic/circuitry that performs one or more storage-related services. For example, the controller 110 can have an architecture designed to manage the storage array's computing, storage, and memory resources as described in greater detail herein.

Figure 2:
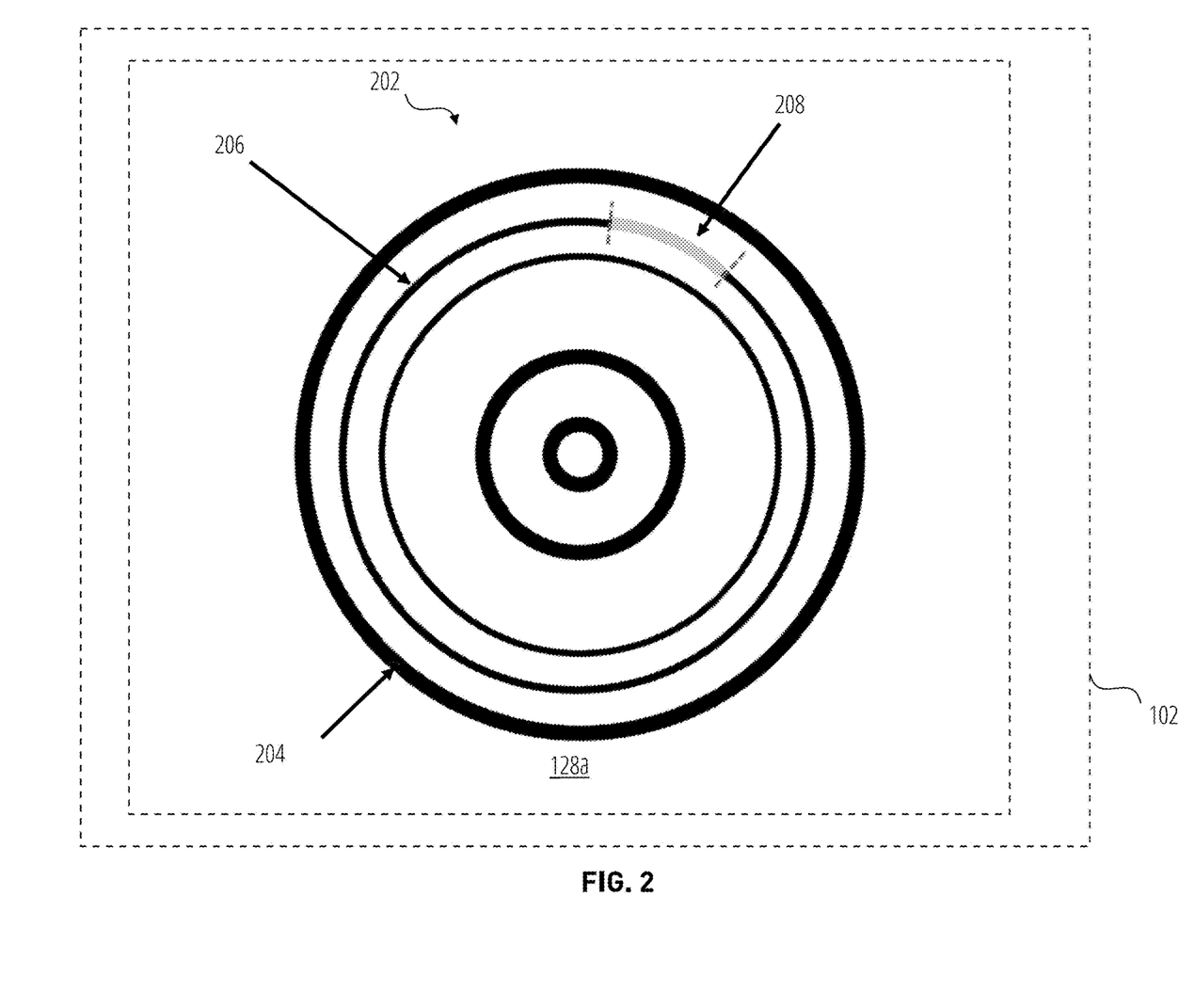
FIG. 2 is a cross-sectional view of a storage device in accordance with embodiments of the present disclosure.

Regarding FIG. 2, the storage array 102 can include an EDS 108 that virtualizes the array's storage devices 126. In embodiments, the EDS 108 can provide a host, e.g., client machine 136a, with a virtual storage device (e.g., thin-device (TDEV)) that logically represents one or more of the storage array's memory/storage resources or physical slices/portions thereof. Further, the EDS 108 can provide each TDEV with a unique identifier (ID) like a target ID (TID). Additionally, EDS 108 can map each TID to its corresponding TDEV using a logical unit number (LUN) (e.g., a pointer to the TDEV).

For example, the storage devices 126 can include an HDD 202 with stacks of cylinders 204. Like a vinyl record's grooves, each cylinder 204 can include one or more tracks 206. Each track 206 can include continuous sets of physical address spaces representing each of its sectors 208 (e.g., slices or portions thereof). The EDS 108 can provide each slice/portion with a corresponding logical block address (LBA). Additionally, the EDS 108 can group sets of continuous LBAs to establish a virtual storage device (e.g., TDEV). Thus, each TDEV can include LBAs corresponding to one or more of the storage devices 126 or portions thereof.

As stated herein, the storage devices 126 can have distinct performance capabilities. For example, an HDD architecture is known by skilled artisans to be slower than an SSD's architecture. Likewise, the array's memory 114 can include different memory types, each with distinct performance characteristics described herein. In embodiments, the EDS 108 can establish a storage or memory hierarchy based on the SLA and the performance characteristics of the array's memory/storage resources. For example, the SLA can include one or more Service Level Objectives (SLOs) specifying performance metric ranges (e.g., response times and uptimes) corresponding to the hosts' performance requirements.

Further, the SLO can specify service level (SL) tiers corresponding to each performance metric range and categories of data importance (e.g., critical, high, medium, low). For example, the SLA can map critical data types to an SL tier requiring the fastest response time. Thus, the storage array 102 can allocate the array's memory/storage resources based on an IO workload's anticipated volume of IO messages associated with each SL tier and the memory hierarchy.

For example, the EDS 108 can establish the hierarchy to include one or more tiers (e.g., subsets of the array's storage and memory) with similar performance capabilities (e.g., response times and uptimes). Thus, the EDS 108 can establish fast memory and storage tiers to service host-identified critical and valuable data (e.g., Platinum, Diamond, and Gold SLs). In contrast, slow memory and storage tiers can service host-identified non-critical and less valuable data (e.g., Silver and Bronze SLs). Additionally, the EDS 108 can define "fast" and "slow" performance metrics based on relative performance measurements of the array's memory 114 and storage devices 126. Thus, the fast tiers can include memory 114 and storage devices 126 with relative performance capabilities exceeding a first threshold. In contrast, slower tiers can include memory 114 and storage devices 126, with relative performance capabilities falling below a second threshold. In embodiments, the first and second thresholds can correspond to the same threshold.

In embodiments, the EDS 108 can establish logical tracks (e.g., track identifiers (TIDs) by creating LBA groups that include LBAs corresponding to any storage devices 126. For example, the EDS 108 can establish a virtual storage device (e.g., a logical unit number (LUN)) by creating TID groups. Further, the EDS 108 can generate a searchable data structure, mapping logical storage representations to their corresponding physical address spaces. Further, the HA 106 can present the hosts 134 with the logical memory and storage representations based on host or application performance requirements.

Figure 3A:
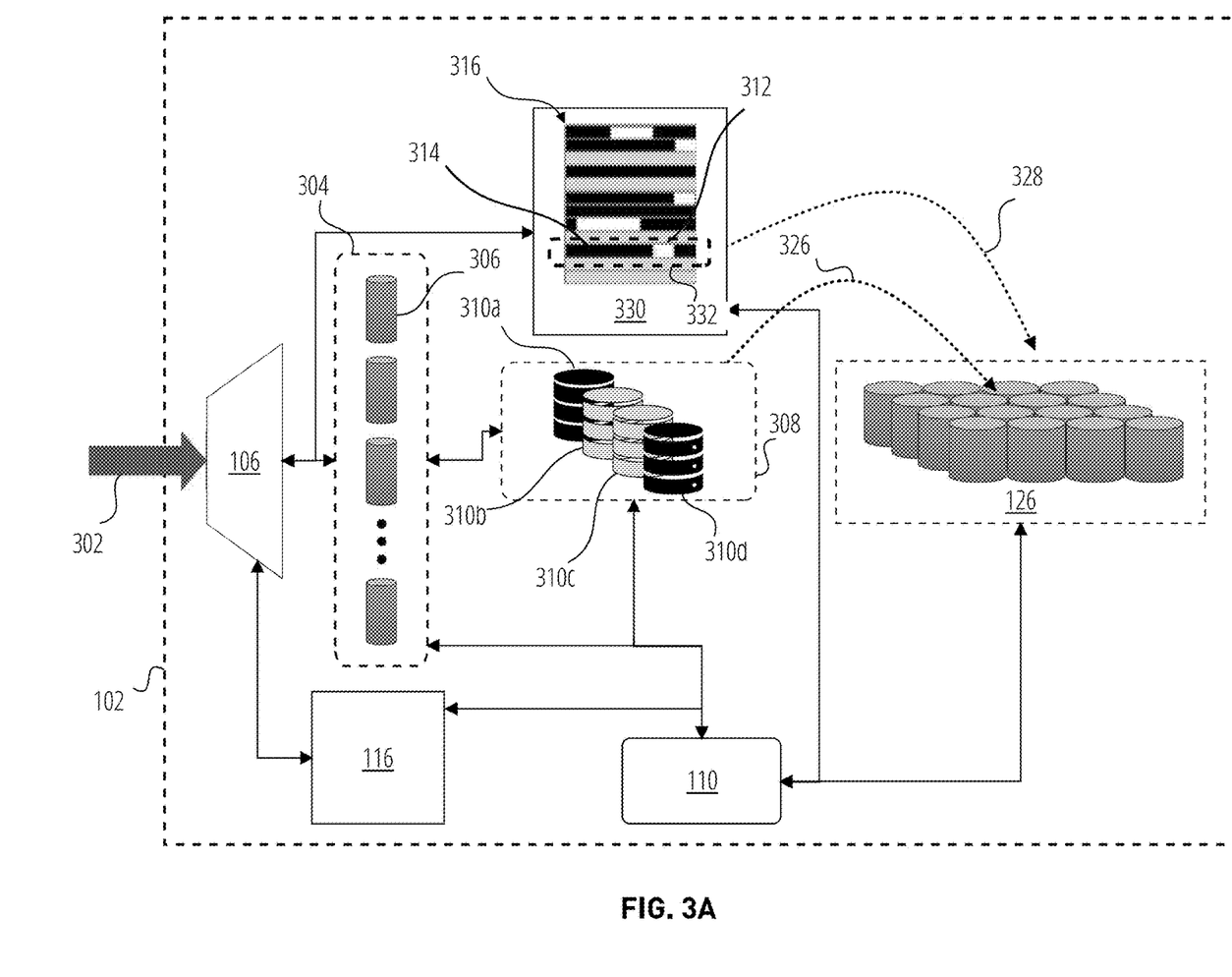
FIG. 3A is a communication block diagram in accordance with embodiments of the present disclosure.

Regarding FIG. 3A, the storage array 102 can include a controller 110 that includes logic/circuitry configured to perform one or more memory and storage management techniques. For example, the controller 110 can establish one or more virtual storage devices 304 as described above. The virtual storage devices 304 can include thin devices such as TDEV 306. Specifically, the controller 110 can virtualize portions and one or more storage devices 126 to establish, e.g., the TDEV 306. In embodiments, the controller 110 can establish a redundant array of independent disks (RAID) storage group (RG) such as RG 308 using one or more of the storage devices 126. For example, the controller 110 can establish RG 308 using storage volumes 310a-310d selected from the storage devices 126. Accordingly, the controller 110 can establish the TDEV 306 using the RG 308.

In embodiments, the RG 308 can include data members (D) and parity members (P). The D-members can store data, while the P-members can store parity information (e.g., XORs of the data). The controller 110 and the RG members (e.g., physical storage volumes 310a-310d) can access the parity information to discover information corresponding to each member's stored data. Accordingly, the parity information allows the controller 110 to distribute data across all the RG members 310a-310d and recover data if one or more D-members 310a-310d fail.

In embodiments, the storage array 102 can include IO workloads having IO write requests targeting the TDEV 306. The controller 110 can cache such IO write requests in a cache 330 corresponding to GM 116. Specifically, the cache 330 can include cache slots 316 corresponding to portions of the GM 116. Additionally, each cache slot 332 can correspond to an RG member's track (e.g., track 206). Thus, in some examples, the controller 110 can only destage a cache slot 332 once it is filled.

In embodiments, the controller 110 can assign the RG 308 with memory resources. For example, the controller 110 can analyze metadata from an IO workload's corresponding IO requests. The metadata can include information like IO size, IO type, a TID/LUN, and performance requirements, amongst other related information. The controller 110 can generate workload models to form predictions corresponding to IOs targeting TDEV 306. Thus, the controller 110 can map cache slots 316 to corresponding RG member slices (e.g., sector 208 of FIG. 2). Accordingly, the controller 110 can obtain a TID, LBA, or LUN from an IO request's metadata and cache the IO request and its payload in one or more of the cache slots 316 corresponding to the TID, LBA, or LUN.

Generally, hosts 134 use the storage array 102 as a remote/distributed persistent data storage solution. However, writing data to one or more of the physical storage devices 126 can span a duration that fails to satisfy an SLA. Thus, the controller 110 can issue the HA 106 instructions to send the hosts 134 a storage confirmation when an IO and its payload are cached but before they are destaged to persistent physical storage (e.g., the RG's corresponding physical storage volumes 310a-310d).

Occasionally, a RAID group like RG 308 can experience multiple storage volume failures causing the controller 110 to flag each failed volume as not ready (NR). For example, such a failure can result in the RG 308 having NR members 310a, 310d, and healthy members 310b-310c. Thus, the controller 110 can perform one or more operations to recover storage services for the TDEV 306. Specifically, the controller can provide the TDEV 306 with a new RG using one or more of the array's available storage devices 126. Further, the controller 110 can perform drain techniques 326 to migrate data from the healthy members 310b-310c to one or more of the available storage devices 126 allocated to the new RG.

However, the failure experienced by the RG 308 can occur before corresponding cached IO write requests and data payloads can be destaged to persistent physical storage. Additionally, the storage array 102 can receive and cache additional IO requests targeting the RG 308 and its NR members 310a, 310b while the controller performs the drain 326. Thus, one or more of the cache slots 316 can correspond to a partially filled write-pending track 206 of one of the NR members 310a, 310d. For example, the controller 110 can assign cache slot 332 to cache data corresponding to a track (e.g., track 206 of FIG. 2) from NR member 310a. The cache slot 332 can include filled cache blocks 314, and empty cache blocks 312 corresponding to the track from NR member 310a. Consequently, current naïve approaches discard the write pending data from the cache slot 332, resulting in data loss. In contrast, the controller 110 can perform cache recovery operations 328 to prevent such data loss, as described in greater detail herein.

Figure 3B:
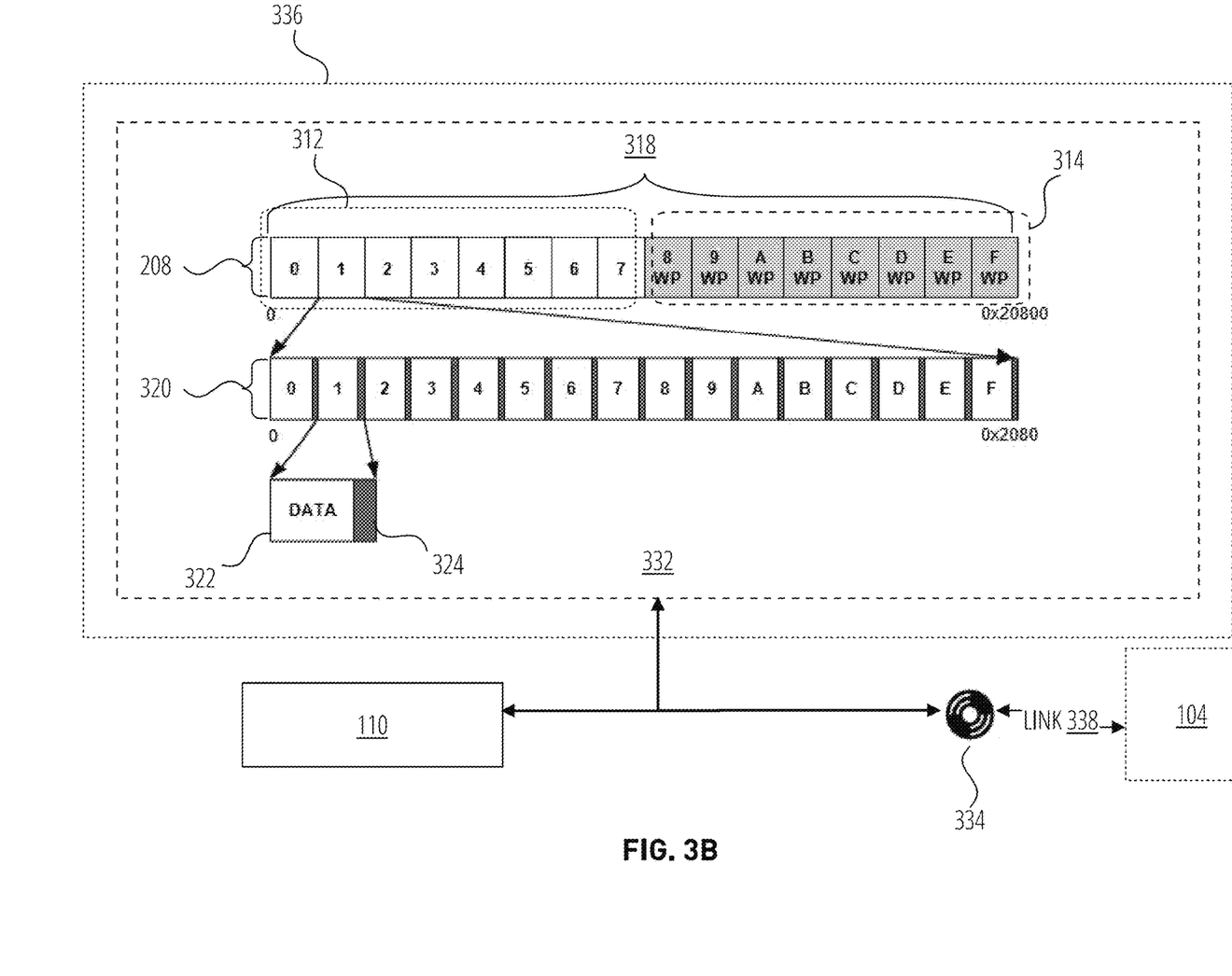
FIG. 3B is a block diagram of cache memory in accordance with embodiments of the present disclosure.

Regarding FIG. 3B, the controller 110 can include logic/circuitry designed to perform the cache recovery operations 328. For instance, the cache recovery operations 328 can include techniques that prevent data from partially filled write-pending cached track of a RAID group's NR member from becoming lost.

In embodiments, the storage array 102 can include one or more daemons 334 that can monitor the array's components 104. For example, the daemons 334 can establish a link 338 to the array's components 104 to monitor the storage devices 126 and cache 330. Further, the daemons 334 can record events corresponding to the storage devices 126 and cache 330 in one or more activity logs. Additionally, the daemons 334 can record each component's global ready state from each component's device header.

In embodiments, the controller 110 can obtain the activity logs to identify each RG 308 and its corresponding member states. Accordingly, the controller 110 can periodically or randomly perform a read of the activity logs to identify device states. In response to identifying the NR members 310a, 310d of RG 308, the controller 110 can perform one or more operations to recover storage services for the TDEV 306. For example, the controller 110 can perform a drain 326 of the healthy members 310b-310c as described above. Additionally, the controller 110 can identify any cache slots 316, including filled cached data blocks corresponding to one or more RG members 308.

In embodiments, the controller 110 can identify cache slots, like cache slot 332, corresponding to a partially filled WP (write-pending) track 318 of, e.g., NR member 310a. For example, the cache slot 332 can include empty cache blocks 312, and NR-related filled cache blocks 314. The empty cache blocks 312 can correspond to sectors 0-7, and the NR-related filled cache blocks 314 can correspond to sectors 8-9, A-F of the partial WP cached tracks 318. Furthermore, the empty cache blocks 312 can correspond to respective sets of continuous LBAs 320 of the TDEV 306. Thus, each set of contiguous LBAs 320 can correspond to a sector of the NR member 310a. Further, each LBA can correspond to data 322 or a portion thereof stored by the TDEV 306. Additionally, the LBAs 320 can include metadata 324 with information corresponding to the data 322. For example, an LBA's metadata 324 can define its related physical address space corresponding to the NR member 310a.

In embodiments, the controller 110 can generate fake data using a data generator (not shown). For instance, the controller 110 can provide the data generator with a total size corresponding to the empty cache blocks 312 so it can generate the fake data with a size corresponding to the empty cache blocks 312. For example, the generator can provide the controller 110 with a string of zeros to fill the empty cache blocks 312. In response to filling the empty cache blocks 312, the controller 110 can flag the cache slot 332 as a filled WP cached track. Accordingly, the controller 110 can further destage the now filled WP cached tracks to the new RG established for the TDEV 306. Once each partially filled cache slot corresponding to RG 308 is filled and destaged, the controller 110 can flag the TDEV's new RG as ready (e.g., healthy).

The following text includes details of one or more methods or techniques disclosed herein. Each method is depicted and described as one or more acts for context and without limitation. Each act can occur in various orders or concurrently with other acts described herein, or neither presented nor described herein. Furthermore, each act can be optional and, thus, not required to implement each method described herein.

Figure 4:
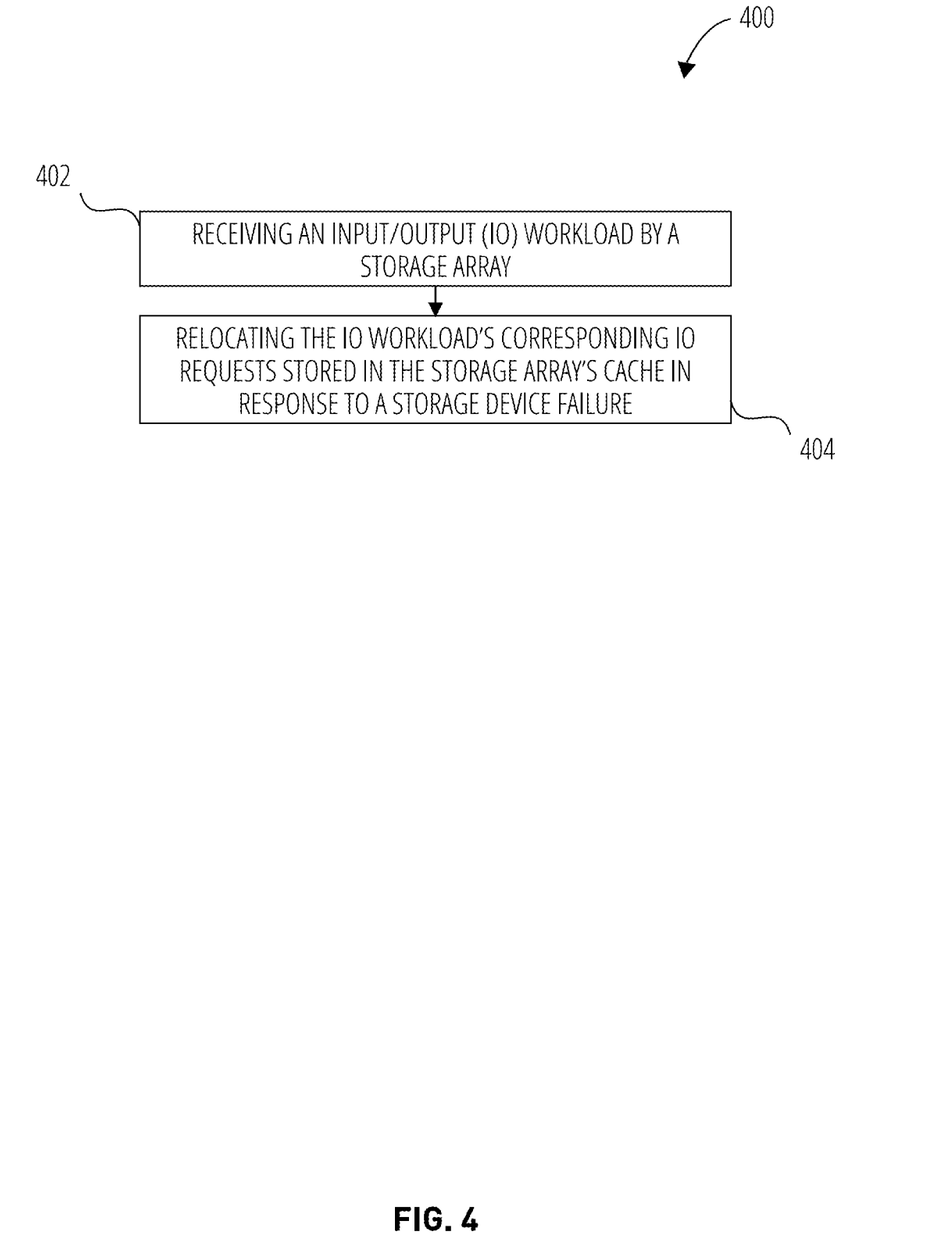
FIG. 4 is a flow diagram of a method for mitigating data loss in accordance with embodiments of the present disclosure.

Regarding FIG. 4, one or more of the array's components 104 can execute a method 400 that includes acts to mitigate data loss resulting from storage device failures. In embodiments, the method 400, at 402, can include receiving an input/output (IO) workload by a storage array. At 404, method 400 can also include relocating the IO workload's corresponding IO requests stored in the storage array's cache in response to a storage device failure. Additionally, each act (e.g., step or routine) of the method 400 can include any combination of techniques described herein.

Figure 5:
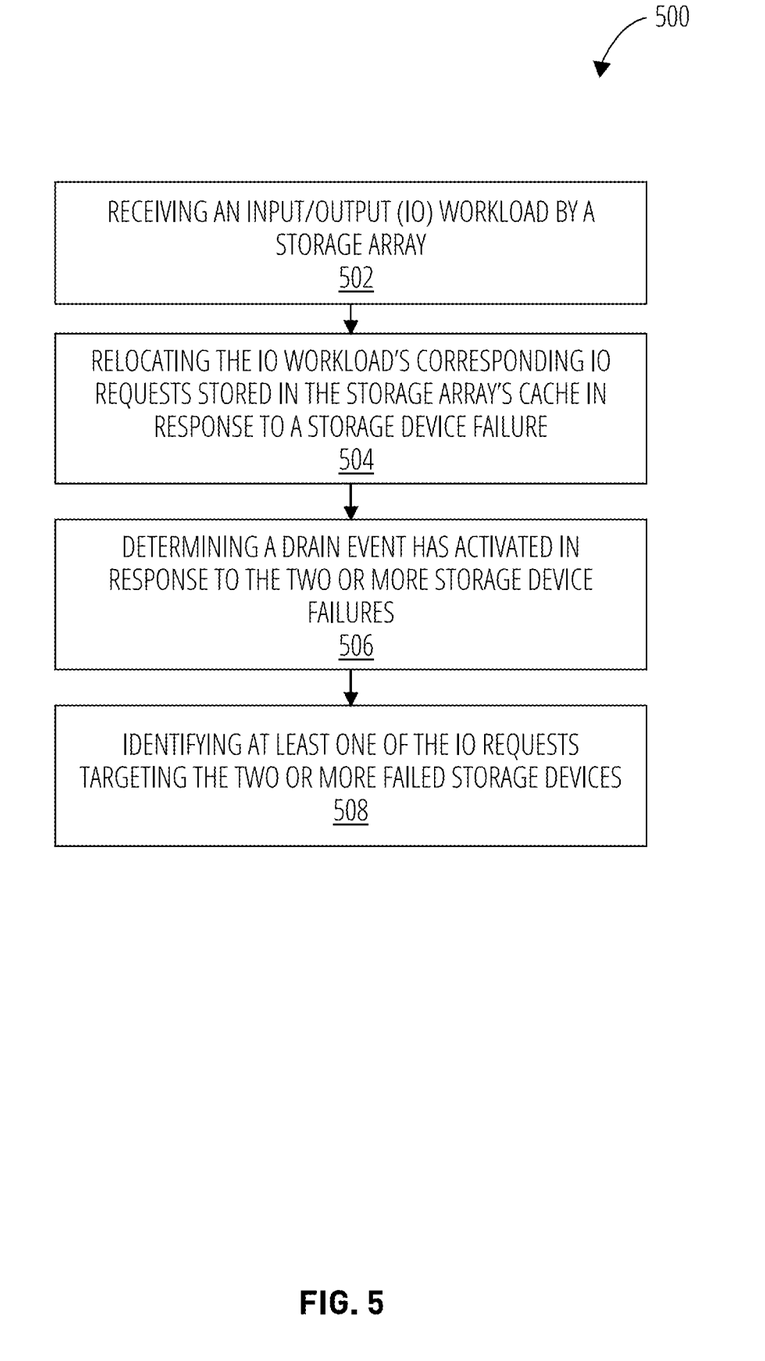
FIG. 5 is a flow diagram of a method for preserving write pending (WP) data due to drive(s) failure in accordance with example embodiments of the present disclosure.

Regarding FIG. 5, one or more of the array's components 104 can execute a method 500 that includes acts to preserve data in response to a drive failure. In embodiments, the method 500, at 502, can include receiving an input/output (IO) workload by a storage array. At 504, method 500 can include relocating the IO workload's corresponding IO requests stored in the storage array's cache in response to a storage device failure. Further, method 500, at 506, can include determining whether a drain event has activated in response to the two or more storage device failures. Additionally, at 508, method 500 can include identifying at least one of the IO requests targeting the two or more failed storage devices. Additionally, each act (e.g., step or routine) of the method 500 can include any combination of techniques described herein.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the method steps. The apparatus can be a special purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special purpose logic circuitry.

A computer having a display device that enables user interaction can implement the above-described techniques such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can provide for interaction with a user. Other devices can, for example, be feedback provided to the user in any form of sensory feedback (e.g., visual feedback, auditory feedback, or tactile feedback). Input from the user can, for example, be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer having a graphical user interface, a Web browser through which a user can interact with an example implementation, or other graphical user interfaces for a transmitting device. Finally, the system's components can interconnect using any form or medium of digital data communication (e.g., a communication network). Examples of communication network(s) include a local area network (LAN), a wide area network (WAN), the Internet, wired network(s), or wireless network(s).

The system can include a client(s) and server(s). The client and server (e.g., a remote server) can interact through a communication network. For example, a client and server relationship can arise by computer programs running on the respective computers and having a client-server relationship. Further, the system can include a storage array(s) that delivers distributed storage services to the client(s) or server(s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) network, time division multiple access (TDMA) network, and global system for mobile communications (GSM) network.

The transmitting device can include, for example, a computer, a computer with a browser device, a telephone, an IP phone, a mobile device (e.g., cellular phone, personal digital assistant (P.D.A.) device, laptop computer, electronic mail device), or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:

1. A method comprising:
   receiving an input/output (IO) workload by a storage array; and
   relocating the IO workload's corresponding IO requests stored in the storage array's cache in response to a storage device failure, wherein relocating the IO workload's corresponding IO requests includes determining a drain event has activated in response to two or more storage device failures.

2. The method of claim 1, further comprising:
   detecting two or more storage device failures while the storage array receives the IO workload.

3. The method of claim 2, further comprising:
identifying each of the two or more storage device failures as belonging to a specific redundant array of independent disks (RAID) group of a plurality of RAID groups.

4. The method of claim 1, further comprising:
identifying at least one of the IO requests targeting the two or more storage devices.

5. The method of claim 4, further comprising:
determining that the at least one IO request is a write pending request cached in one or more memory cache slots; and
anticipating receiving additional IO requests from the IO workload targeting the two or more failed storage devices.

6. The method of claim 5, further comprising:
identifying one or more of the cache slots corresponding to the write pending request being partially filled.

7. The method of claim 6, further comprising:
writing data to each empty data block of the partially filled cache slots.

8. The method of claim 3, further comprising:
identifying each storage drive related to a drain of the RAID group's healthy drives, where each identified storage drive replaces the storage drives currently assigned to the RAID group.

9. The method of claim 1, further comprising:
reallocating cached write pending requests to at least one replacement storage drive.

10. A system configured to:
receive an input/output (IO) workload by a storage array; and
relocate the IO workload's corresponding IO requests stored in the storage array's cache in response to a storage device failure, wherein relocating the IO workload's corresponding IO requests includes determining a drain event has activated in response to two or more storage device failures.

11. The system of claim 10, further configured to:
detect two or more storage device failures while the storage array receives the IO workload.

12. The system of claim 11, further configured to:
identify each of the two or more storage device failures as belonging to a specific redundant array of independent disks (RAID) group of a plurality of RAID groups.

13. The system of claim 10, further configured to:
identify at least one of the IO requests targeting the two or more storage devices.

14. The system of claim 13, further configured to:
determine that the at least one IO request is a write pending request cached in one or more memory cache slots; and
anticipate receiving additional IO requests from the IO workload targeting the two or more failed storage devices.

15. The system of claim 14, further configured to:
identify one or more of the cache slots corresponding to the write pending request being partially filled.

16. The system of claim 15, further configured to:
write data to each empty data block of the partially filled cache slots.

17. The system of claim 12, further configured to:
identify each storage drive related to a drain of the RAID group's healthy drives, where each identified storage drive replaces the storage drives currently assigned to the RAID group.

18. The system of claim 10, further configured to:
reallocating cached write pending requests to at least one replacement storage drive.

* * * * *